US012678718B2

(12) United States Patent
Leo

(10) Patent No.: US 12,678,718 B2
(45) Date of Patent: Jul. 14, 2026

(54) FILTER ELEMENT WITH BIPLANAR O-RING

(71) Applicant: Parker-Hannifin Corporation, Cleveland, OH (US)

(72) Inventor: Alfin Leo, Perrysburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 731 days.

(21) Appl. No.: 17/673,979

(22) Filed: Feb. 17, 2022

(65) Prior Publication Data

US 2022/0288512 A1 Sep. 15, 2022

Related U.S. Application Data

(60) Provisional application No. 63/291,623, filed on Dec. 20, 2021, provisional application No. 63/158,453, filed on Mar. 9, 2021.

(51) Int. Cl.
B01D 35/153 (2006.01)

(52) U.S. Cl.
CPC ...... B01D 35/153 (2013.01); B01D 2201/291 (2013.01); B01D 2201/302 (2013.01); B01D 2201/304 (2013.01)

(58) Field of Classification Search
CPC ............ B01D 35/306; B01D 2201/291; B01D 2201/302; B01D 2201/304; B01D 2201/4046; B01D 2201/4053; B01D 2201/4061; B01D 2201/4076; B01D 2201/34; B01D 2201/347
See application file for complete search history.

(56) References Cited

U.S. PATENT DOCUMENTS

| | | | |
|---|---|---|---|
| 6,936,084 B2 | 8/2005 | Schlensker et al. | |
| 7,494,017 B2 | 2/2009 | Miller | |
| 8,916,044 B2 | 12/2014 | Rapin | |
| 9,433,881 B2 | 9/2016 | Schiavon et al. | |
| 9,480,940 B2 | 11/2016 | Piva et al. | |
| 9,636,608 B2 | 5/2017 | Morris et al. | |
| 2004/0035097 A1 | 2/2004 | Schlensker et al. | |
| 2010/0064646 A1* | 3/2010 | Smith ................ | B01D 46/0005 55/501 |
| 2013/0264275 A1* | 10/2013 | John .................... | B01D 35/147 210/493.2 |
| 2015/0209699 A1* | 7/2015 | Morris ................... | B01D 29/11 210/457 |

FOREIGN PATENT DOCUMENTS

| | | |
|---|---|---|
| WO | WO 2019/219635 A1 | 11/2019 |
| WO | WO 2020/236503 A1 | 11/2020 |

* cited by examiner

*Primary Examiner* — Benjamin M Kurtz
(74) *Attorney, Agent, or Firm* — Reinhart Boerner Van Deuren P.C.

(57) ABSTRACT

A filter element having an end cap with a base and a sleeve surrounding a central aperture in the base and projecting axially outwardly therefrom, where the sleeve includes i) a notched locating feature in a distal edge of the sleeve; and ii) a seal surrounding the outer surface of the sleeve and having planar segments, with a first planar segment located between the locating feature and the distal edge of the sleeve, and a second planar segment, extending along a plane different from the first planar segment, located between the notched locating feature and the base. In an alternate embodiment, the sleeve includes an axially-extending locating feature on an outer surface thereof.

15 Claims, 8 Drawing Sheets

FILTER ELEMENT WITH BIPLANAR O-RING

CROSS-REFERENCE TO RELATED PATENT APPLICATIONS

This patent application claims the benefit of U.S. Provisional Patent Application No. 63/291,623, filed Dec. 20, 2021, and claims the benefit of U.S. Provisional Patent Application No. 63/158,453, filed Mar. 9, 2021, the entire teachings and disclosures of which are incorporated herein by reference thereto.

FIELD OF THE INVENTION

This invention generally relates to a filter element and assembly for filtering fluids such as fuel, oil or gas.

BACKGROUND OF THE INVENTION

Typically, in certain filtration applications, a replaceable filter element has an end cap, which is connected to the head of a filter module. The module generally includes a canister, which receives the element, and inlet and outlet ports in the head which direct fluid into and out of the module. The fluid passes through the filter element, which separates particles and other contaminants from the fluid which is then returned to the operating system. In order for the filter element to properly function and not leak, a positive seal must be maintained with the filter head. Typically, hydraulic filter elements use an O-ring supported along a plane in a straight cut or radial seal gland design. A sloped or angled seal gland design has been used, for example as shown in U.S. Pat. Nos. 8,916,044 and 7,494,017, the entire teachings and disclosures of which are incorporated herein by reference thereto. A liquid filter assembly is taught in U.S. Pat. No. 9,480,940, the entire teachings and disclosure of which are incorporated herein by reference thereto.

Embodiments of the invention detailed below represent an improvement to the state of the art with respect to hydraulic filtration devices. These and other advantages of the invention, as well as additional inventive features, will be apparent from the description of the invention provided herein.

BRIEF SUMMARY OF THE INVENTION

In one aspect, embodiments of the invention provide a filter end cap that includes a base and a sleeve attached to the base. The sleeve surrounds a central aperture in the filter end cap and projects axially away from the base. The sleeve includes a notched locating feature in a distal edge of the sleeve. A seal groove surrounds an outer surface of the sleeve. The seal groove has a first planar segment lying in a first plane and located between the base and the distal edge of the sleeve, and a second planar segment lying in a second plane different from the first plane. The second planar segment is located between the base and the notched locating feature.

In a particular embodiment, the filter end cap further includes a seal having a first planar segment lying a first seal plane and a second planar segment lying in a second seal plane different from the first seal plane. The seal is configured to seat in the seal groove. In a further embodiment, the seal includes two connecting portions that connect the first planar segment to the second planar segment.

In a particular embodiment, the first plane is normal to the axially-projecting sleeve. In another embodiment, the second plane is normal to the axially-projecting sleeve such that the first plane is parallel to the second plane. Furthermore, in some embodiments, the notched locating feature is rectangular. The sleeve is cylindrical in certain embodiments of the invention. The base may also be cylindrical. In the embodiments shown, the sleeve and the base are circular cylinders. However, in alternate embodiments the sleeve may be oval or prismatic (e.g., a rectangular prism, a triangular prism, etc.). In other embodiments, the sleeve has a groove in the outer surface of the sleeve, the groove circumscribing the sleeve, wherein the seal sits in the groove.

In some embodiments, the seal groove includes first and second axially-extending segments that connect the first and second planar segments. Additionally, the end cap may be configured to be assembled in an opening of a filter head. In certain embodiments, the notched locating feature is configured to align with a relief feature of the filter head. In a further embodiment, the groove is in the first planar segment, in the second planar segment, and includes axially-extending segments that connect the first and second planar segments.

In another aspect, embodiments of the invention provide a filter head for use with the aforementioned filter end cap. The filter head includes a body that has a central opening that extends into an interior of the body. The central opening extends parallel to a longitudinal axis of the body. The central opening is configured to accommodate the sleeve when the filter end cap is assembled to the filter head. A wall portion in the interior of the body defines the central opening. The wall portion has a relief feature configured to align with the notched locating feature in the sleeve. A secondary opening extends, parallel to the longitudinal axis and into an interior of the body, a shorter distance than the central opening. The secondary opening is configured to accommodate the base when the filter end cap is assembled to the filter head.

In a particular embodiment, a cross-sectional area of the secondary opening is larger than a cross-sectional area of the central opening such that the entire cross-sectional area of the central opening resides within the cross-sectional area of the secondary opening. In certain embodiments, the central opening and the secondary opening are concentric. The central opening may have a circular cross-section. Additionally, the secondary opening may have a circular cross-section. Further, in some embodiments, the body may be cylindrical.

In other embodiments, the body also includes a bore-through portal which extends, transverse to the longitudinal axis, from a first opening in a first location of an outer wall of the body through the body to a second opening in a second location of the outer wall, wherein the first location is different from the second location, and wherein the bore-through portal intersects with the central opening. In a further embodiment, the bore-through portal intersects with the central opening at a distal end of the central opening.

In a further embodiment, the central opening includes a relief feature to facilitate liquid flow through the filter head. In a particular embodiment, the relief feature includes a chamfered edge of the wall portion, where the relief feature is aligned with the end cap locating feature and the notched locating feature.

In yet another aspect, embodiments of the invention provide a filter assembly that includes a filter end cap with a base and a sleeve attached to the base. The sleeve surrounds a central aperture in the filter end cap and projects axially away from the base. The sleeve includes a notched locating feature in a distal edge of the sleeve. A seal groove surrounds an outer surface of the sleeve. The seal groove has a first planar segment lying in a first plane and located between the base and the distal edge of the sleeve, and a second planar segment lying in a second plane different from the first plane. The second planar segment is located between the base and the notched locating feature. A filter head is assembled to the filter end cap. The filter head has a body with a central opening that extends into an interior of the body. The central opening extends parallel to a longitudinal axis of the body. The central opening is configured to accommodate the sleeve. A wall portion in the interior of the body defines the central opening. The wall portion has an end cap locating feature configured to align with the notched locating feature in the sleeve. A secondary opening extends parallel to the longitudinal axis and into an interior of the body a shorter distance than the central opening. The secondary opening is configured to accommodate the base of the filter end cap when the end cap is assembled to the filter head.

In a particular embodiment, the body further includes a bore-through portal which extends, transverse to the longitudinal axis, from a first opening in a first location of an outer wall of the body through the body to a second opening in a second location of the outer wall. The first location is different from the second location, and the bore-through portal intersects with the central opening.

In certain embodiments, the first plane is normal to the axially-projecting sleeve, and the second plane is normal to the axially-projecting sleeve such that the first plane is parallel to the second plane. In certain embodiments, the seal groove circumscribes the sleeve, and includes axially-extending segments that connect the first and second planar segments.

In a further embodiment, the filter end cap further comprises a seal having a first planar segment lying a first seal plane and a second planar segment lying in a second seal plane different from the first seal plane, the seal being configured to seat in the seal groove. The seal may further include a connecting portion that connects the first planar segment to the second planar segment.

In a further embodiment, a cross-sectional area of the secondary opening is larger than a cross-sectional area of the central opening such that the entire cross-sectional area of the central opening resides within the cross-sectional area of the secondary opening.

In still another aspect, embodiments of the invention provide a filter element having an end cap with a base and a sleeve surrounding a central aperture in the filter end cap and projecting axially away from the base. In some embodiments, the sleeve may include an axially-extending locating feature on an outer surface thereof. The sleeve also includes a notched locating feature in a distal edge of the sleeve, and a seal surrounding the outer surface of the sleeve and having planar segments. A first planar segment is located between the locating feature and the distal edge of the sleeve. A second planar segment, extending along a plane different from the first planar segment, is located between the notched locating feature and the base.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
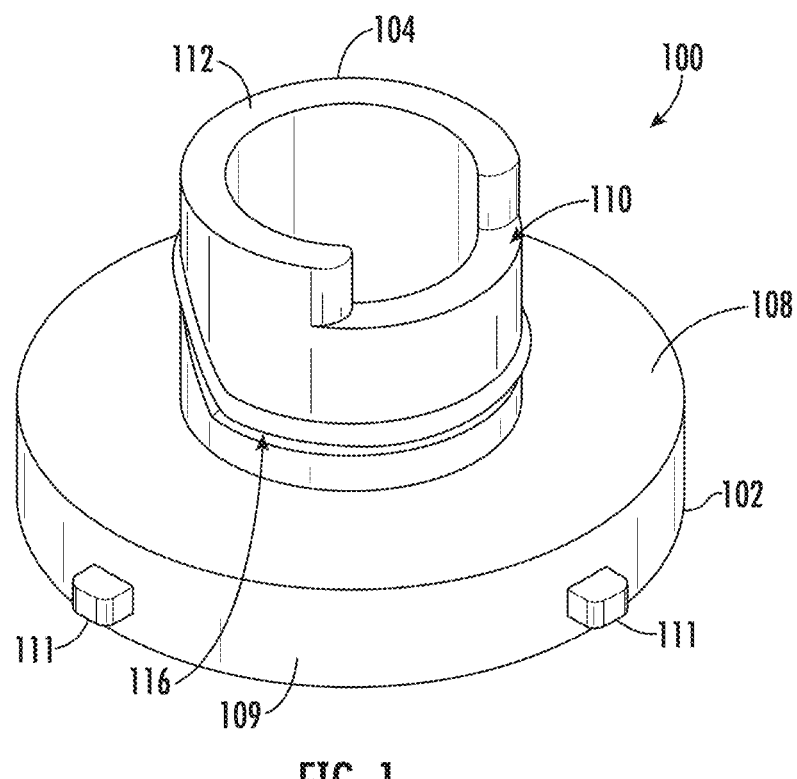
FIG. 1 is a perspective view of a filter end cap, constructed in accordance with an embodiment of the invention.
Figures 2, 3:
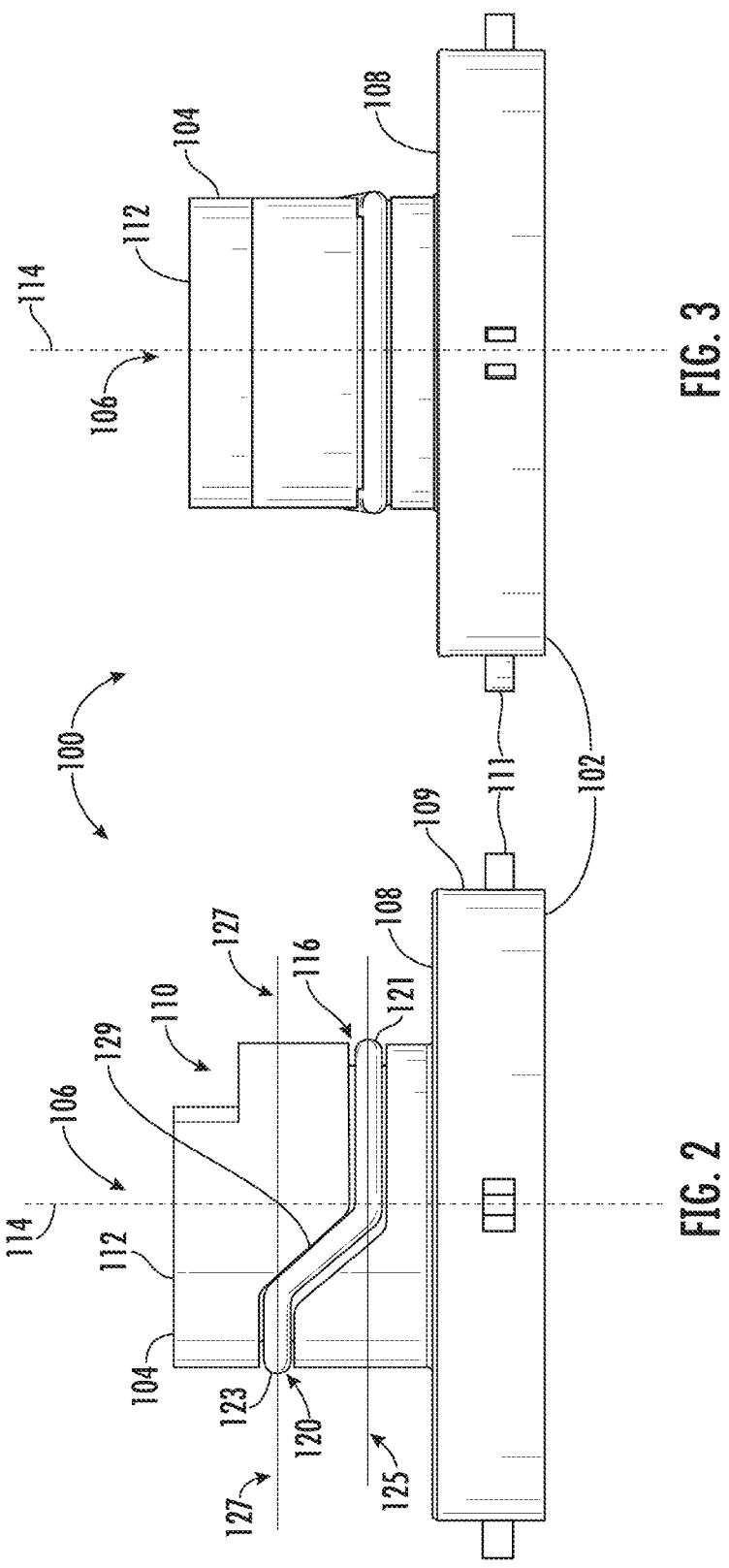
FIGS. 2 and 3 are respective side and front plan view of the filter end cap, according to an embodiment of the invention.

FIG. 1 is a perspective view of a filter end cap 100, constructed in accordance with an embodiment of the invention. FIGS. 2 and 3 are plan views of the filter end cap 100 showing a side view and front view in accordance with an embodiment of the invention. The filter end cap 100 includes a base 102, and a sleeve 104 that surrounds a central aperture 106 in the filter end cap 100. In the embodiment shown, the sleeve 104 projects axially away from the base 102. As shown, the filter end cap 100 includes a central, longitudinal axis 114. As used herein, the term "axially", with respect to the filter end cap 100, refers to a direction that extends along, or parallel to, the longitudinal axis 114. Use of the term "radially", with respect to the filter end cap 100, refers to a direction that extends perpendicularly in any direction away from the longitudinal axis 114.

The sleeve 104 is cylindrical in certain embodiments of the invention, such as the embodiment of FIGS. 1-3. Further, as also shown in FIGS. 1-3, the base 102 may be cylindrically-shaped with a circular flat portion 108 that extends radially outward from an outer surface 118 of the sleeve 104, and a vertical wall portion 109 that extends axially form a perimeter of the flat portion 108. The filter end cap 100 may also include a plurality of radially-outward projecting tabs 111 attached to the vertical wall portion 109. In cases where both the base 102 and sleeve 104 are cylindrical, these two elements may be concentric wherein the base 102 has a larger circular cross-section than the sleeve 104.

In particular embodiments, the sleeve 104 includes a notched locating feature 110 in a distal edge 112 of the sleeve 104. The notched locating feature 110 is a cutout portion of the sleeve 104 that extends axially from the distal edge 112 and extends circumferentially around a portion of the sleeve 104. As shown, the notched locating feature 110 is bounded on three sides by the sleeve 104. Furthermore, in some embodiments such as shown in FIGS. 1-3, the notched locating feature 110 is rectangular, at least on three sides. In the context of the present description, rectangular on three sides is defined as having two sides that are parallel with each other, and a third side perpendicular to the two parallel sides. As shown in FIGS. 1-3, the notched locating feature 110, being on the distal edge 112 of the sleeve 104, is such that there is no fourth side to the notched locating feature 110.

In the embodiment shown, the sleeve 104 has a groove 116 in an outer surface 118 of the sleeve 104, the groove 116 circumscribing the sleeve 104, wherein the groove 116 is configured to accommodate a seal which shall be described in more detail below. As can be seen, the groove 116 is biplanar to accommodate a seal that circumscribes the sleeve 104 in more than one plane. Thus, a resilient biplanar O-ring seal 120 has been developed that compresses to seal against the lower side of the sleeve 104 below the notched locating feature 110, and against the high side of the sleeve 104 opposite the notched locating feature 110. As the name implies, the biplanar O-ring seal 120 lies in two planes, which may be normal to the tubular sleeve 104. The biplanar O-ring seal 120 allows for a variety of different locating features, and further allows for more flexibility in locating various types of instrumentation than a standard circular or inclined O-ring.

Figure 4:
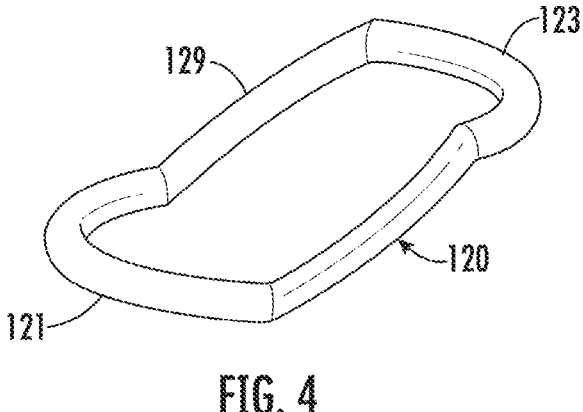
FIG. 4 is a perspective view of a biplanar O-ring, constructed in accordance with an embodiment of the invention.
Figure 5:
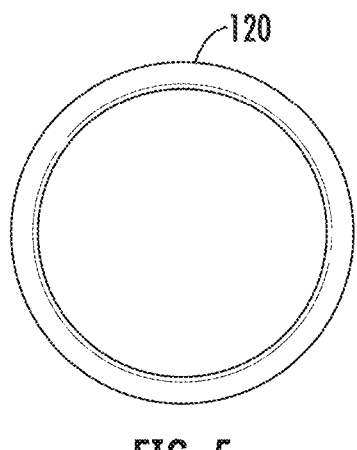
FIG. 5 is a top view of the biplanar O-ring of FIG. 4.

FIG. 4 is a perspective view of a biplanar O-ring-type seal 120, constructed in accordance with an embodiment of the invention, while FIG. 5 is a top view of the biplanar O-ring-type seal 120 of FIG. 4. In the embodiment of FIG. 4, the seal 120 has an angled, multi-planar configuration, for example a bi-planar configuration, where a first planar segment 121 of the seal 120 extends in a first plane 125 and a second planar segment 123 of the seal 120 extends in a second plane 127 different from the first plane 125. In the embodiment shown, the first planar segment 121 of the seal 120 is located between the flat portion 108 of the base 102 and the second planar segment 123. The second planar segment 123 is located between the distal edge 112 of the sleeve 104 and the first planar segment 121. The planar segments 121 and 123 can be located in planes 125, 127 that are parallel or non-parallel with each other, and each plane 125, 127 can extend perpendicularly to the longitudinal axis 114 of the filter end cap 100, or at a non-90-degree angle to the longitudinal axis 114

When assembled to the filter end cap 100, the O-ring-type seal 120 surrounds the outer surface 118 of the sleeve 104. Like the O-ring-type seal 120 itself, the groove 116 has a first planar segment 121 that corresponds to first planar segment 121 and lies in the first plane 125, and a second planar segment that corresponds to second planar segment 123 and lies in the second plane 127. In the embodiment of FIGS. 1-3, the seal 120 is shown seated in the groove 116 of sleeve 104.

As mentioned briefly above, there are embodiments of the invention in which the first plane 125 is parallel to the second plane 127 in axial spaced relation. In a more particular embodiment such as that shown in FIG. 2, the first and second planes 125, 127 are both normal to the longitudinal axis 114 and to the outer surface 118 of the sleeve 104, when the seal 120 is seated in the groove 116. As cam be seen in FIGS. 2 and 4, the groove 116 and seal 120 may each include a connecting portion 129 that extends axially to connect the first planar segment 121 to the second planar segment 123.

Figure 6:
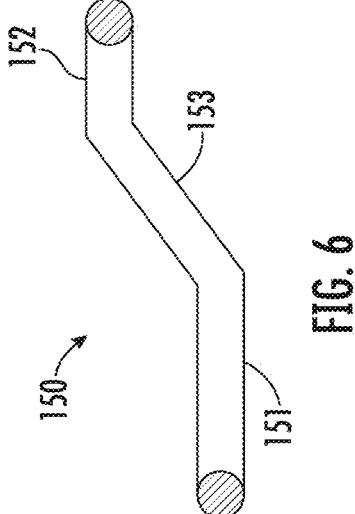
FIGS. 6-9 show cross-sectional side views of multi-planar O-ring-type seals different from the embodiment shown in FIGS. 4 and 5, according to an embodiment of the invention.
Figure 7:
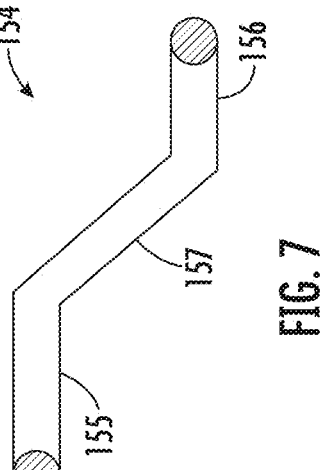

FIGS. 6-9 show cross-sectional side views of different embodiments of the O-ring-type seal 120. FIGS. 6 and 7 depict two seals 150, 154 that are similar to the seal 120 of FIGS. 4 and 5. However, it can be seen that the FIG. 7 seal 154 has greater axial separation between the two planar segments 151, 152 than between the two planar segments 155, 156 in the FIG. 6 seal 150. As such, the connecting portion 157 of the FIG. 7 seal 154 is longer and more vertically-oriented than the connecting portion 153 of the FIG. 6 seal 150. It can also be seen that the lengths of the planar segments 151, 152 in seal 150 are slightly different from the lengths of the planar segments 155, 156 in seal 154.

Figure 8:
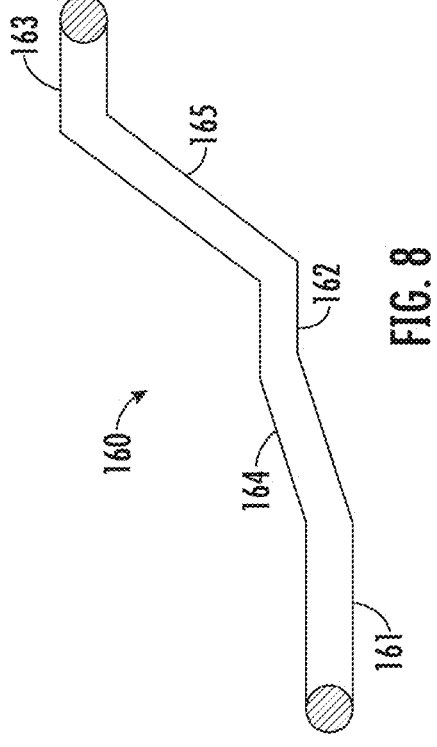
Figure 9:
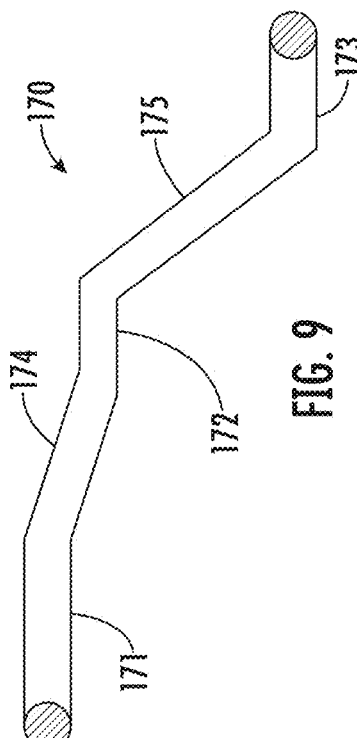

FIGS. 8 and 9 both show embodiments of O-ring-type seals 160, 170 with three planar segments (161, 162, 163), (171, 172, 173) and two connection portions (164, 165), (174, 175). The more complex O-ring-type seals 160, 170 allow for the placement of instrumentation hardware disposed on the sleeve 104 between the base 102 and the seal 120, 160, 170. The instrumentation may be for pressure measurements, temperature measurements, etc. The placement of the instrumentation between the base 102 and the seal 120, 160, 170 ensures that the instrumentation is not exposed to the flow of oil as it moves through the filter assembly.

Figure 10:
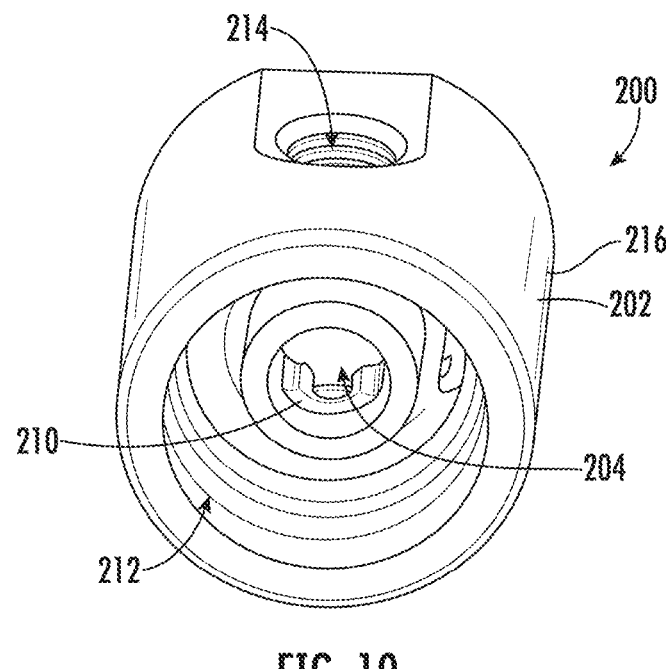
FIG. 10 is a perspective view of a filter head, constructed in accordance with an embodiment of the invention.
Figure 11:
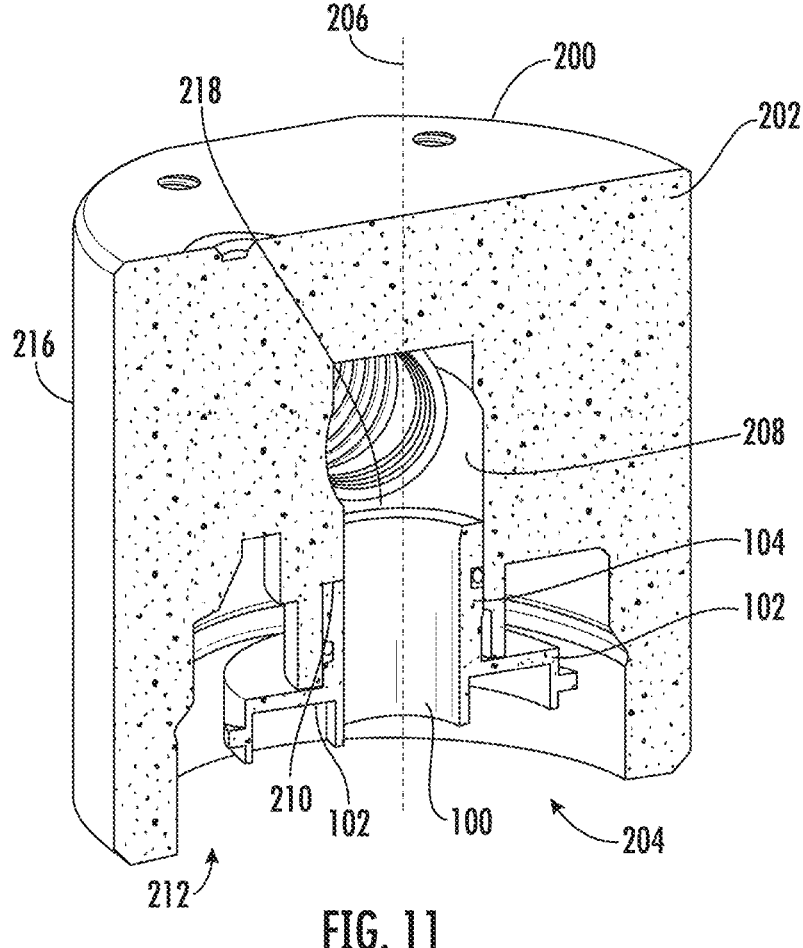
FIGS. 11 and 12 are cross-sectional views of the filter head of FIG. 10, shown assembled to the filter end cap of FIG. 1.
Figure 12:
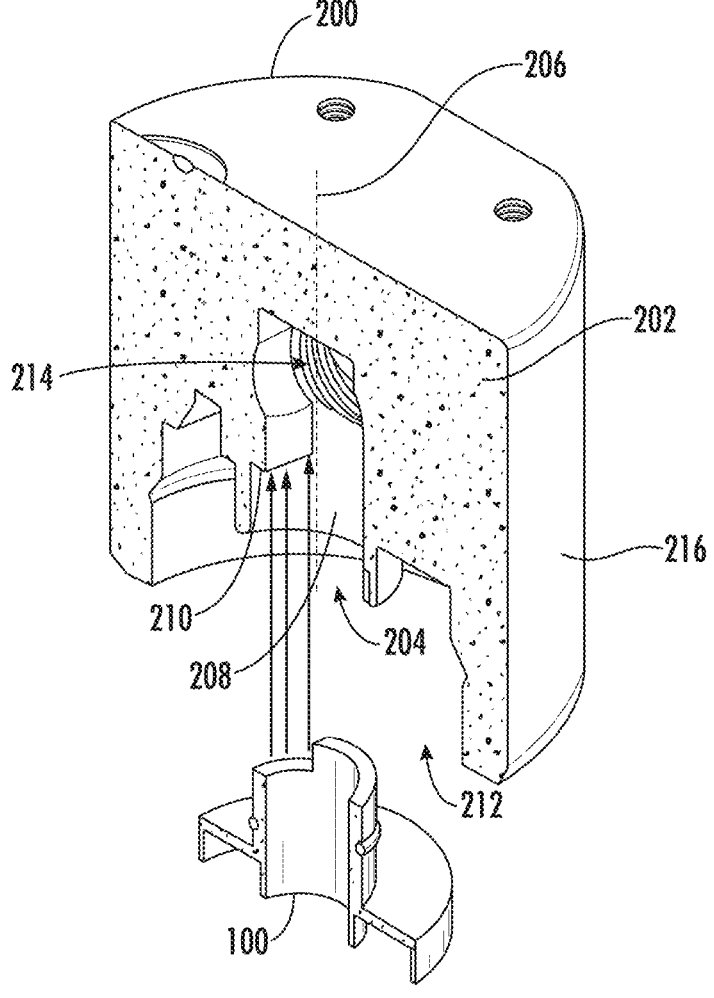

FIG. 10 is a perspective view of a filter head 200, constructed in accordance with an embodiment of the invention, while FIGS. 11 and 12 are cross-sectional views of the filter head 200 of FIG. 10 shown assembled to the filter end cap. The filter head 200 is configured for use with the aforementioned filter end cap 100. The filter head 200 includes a body 202 that has a central opening 204 that extends into an interior of the body 202. In a particular embodiment, the central opening 204 extends parallel to a longitudinal axis 206 of the body 202. As used herein, the term "axially", with respect to the filter head 200, refers to a direction that extends along, or parallel to, the longitudinal axis 206. Use of the term "radially", with respect to the filter head 200, refers to a direction that extends perpendicularly in any direction away from the longitudinal axis 206.

The central opening 204 is configured to accommodate the sleeve 104 when the filter end cap 100 is assembled to the filter head 200. An inner wall portion 208 in the interior of the body 202 defines the central opening 204. The inner wall portion 208 has an end cap location feature 210 configured to align with the notched locating feature 110 in the sleeve 104 when the filter end cap 100 is assembled to the filter head 200. A secondary opening 212 extends, parallel to the longitudinal axis 206 and into an interior of the body 202 for a shorter distance than the central opening 204. The secondary opening 212 is configured to accommodate the base 102 when the filter end cap 100 is assembled to the filter head 200.

In a particular embodiment, a cross-sectional area of the secondary opening 212 is larger than a cross-sectional area of the central opening 204 such that the entire cross-sectional area of the central opening 204 resides within the cross-sectional area of the secondary opening 212. In certain embodiments, the central opening 204 and the secondary opening 212 are concentric. As shown, the central opening 204 may have a circular cross-section. Additionally, the secondary opening 212 may have a circular cross-section. Further, in some embodiments, the body 202 may be cylindrical.

Figure 13:
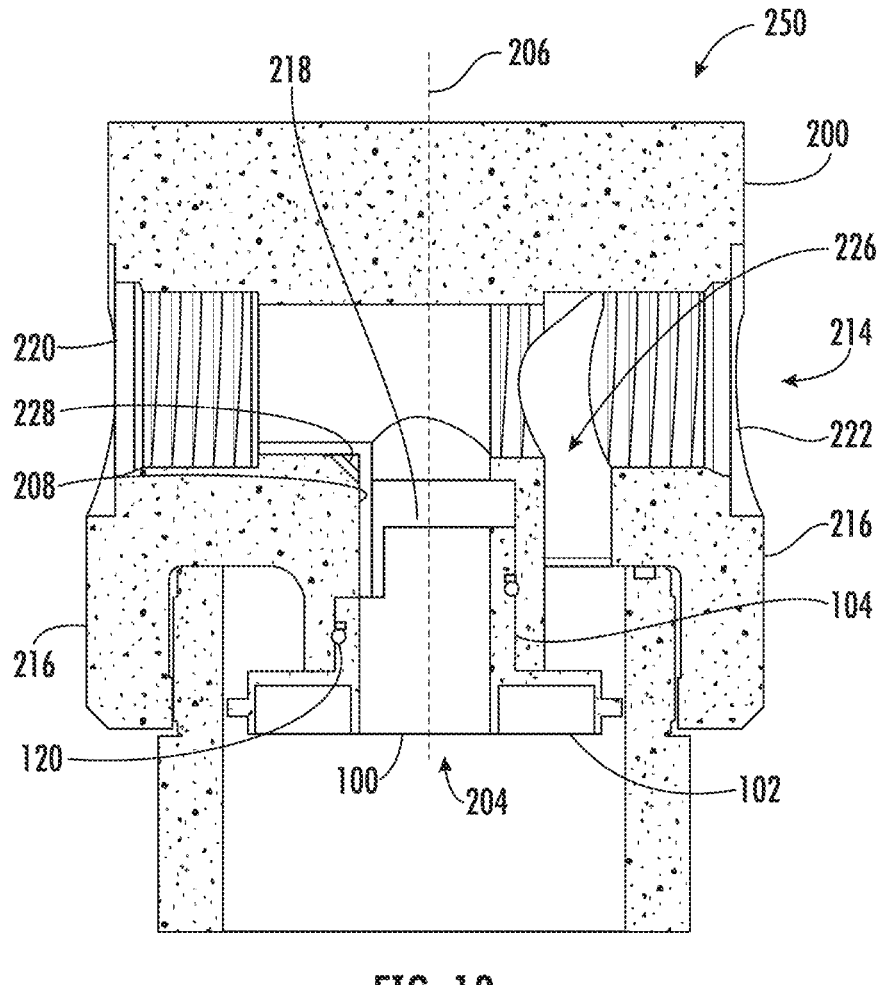
FIG. 13 is a perspective views of a filter assembly, constructed in accordance with an embodiment of the invention.

FIG. 13 is a perspective views of a filter assembly 250 showing the filter end cap 100 assembled to the filter head 200, constructed in accordance with an embodiment of the invention. In the embodiment shown, the body 202 further includes a bore-through portal 214 which extends, transverse to the longitudinal axis 206, from a first opening 220 in a first location of an outer wall 216 of the body 202 through the body 202 to a second opening 222 in a second location of the outer wall 216, wherein the first location is different from the second location, and wherein the bore-through portal 214 intersects with the central opening 204. In a further embodiment, the bore-through portal 214 intersects with the central opening 204 at a distal end 218 of the central opening 204.

The sleeve 104 is inserted into the central opening 204 of the filter head 200. In the embodiment shown, the sleeve 104 extends to the distal end 218 of the central opening 204 which intersects with the bore-through portal 214 that extends transverse to the central opening 204. The base 102 is accommodated by the secondary opening 212 of the filter head 200.

In particular embodiments, the central opening 204 extends parallel to the longitudinal axis 206 of the body 202. The central opening 204 is configured to accommodate the sleeve 104. The inner wall portion 208 is located in the interior of the body 202, the inner wall portion 208 defining the central opening 204. The inner wall portion 208 has the end cap location feature 210 configured to align with the notched locating feature 110 in the sleeve 104. In some embodiments, the secondary opening 212 extends parallel to the longitudinal axis 206 and into the interior of the body 202 for a shorter distance than the central opening 204 extends into the body 202. The secondary opening 212 is configured to accommodate the base 102 of the filter end cap 100 and both the secondary opening 212 and the base 102 may have circular cross-sections.

In order to achieve pressure relief through the filter, the filter end cap 100 and filter head 200 are rotationally aligned such that the notched locating feature 110 on the filter end cap 100 is aligned with the corresponding end cap location feature 210 in the filter head 200. In the embodiment shown, the end cap location feature 210 is rectangular on three sides and fits within the three sides of the corresponding notched locating feature 110. This fixes the orientation of the filter end cap 100 and prevents any rotation of the end cap 100 after assembly to the filter head 200.

As explained above, the embodiment of FIG. 13 shows the notched locating feature 110 and the corresponding end cap location feature 210 as substantially rectangular (i.e., on three sides). However, in alternate embodiments, the notched locating feature 110 and corresponding end cap location feature 210 could be any number of regular or irregular shape, such as semi-circular, wedge-shaped, irregularly curved, stepped, or arcuate, for example.

The filter head 200 accommodates a relief valve (not shown) which is on the clean oil flow path. In the embodiment of FIG. 13, dirty oil flows into the filter assembly 250 via the bore-through portal 214 of the filter head 200 at the second opening 222. The relief valve forces the dirty oil through the filter input opening 226. The oil is forced through the outer surface of the filter element, and the clean, filtered oil flows out through the sleeve 104 in the central opening 204 back into the bore-through portal 214 exiting the filter head 200 from the first opening 220.

The relief valve (not shown) contributes to an additional pressure drop on the clean flow side. Additionally, there is a possibility of restricted fluid acting against the relief valve spring (not shown), where the restricted fluid affects the true cracking pressure of the relief valve. To enhance the flow and reduce the pressure drop between the flow at the second opening 222 and the flow at the first opening 220, the flow relief feature 228 is incorporated in the filter head 200. As can be seen in FIG. 13, the flow relief feature 228 is provided by the chamfered edge of the inner wall portion 208.

The flow relief feature 228 in the filter head 200 is aided by the notch in the notched locating feature 110 of filter end cap 100. The notch in the notched locating feature 110 is configured to align with the end cap location feature 210 and the flow relief feature 228 in order to facilitate the flow of the clean-side oil from the central opening 204 into the bore-through portal 214 and out of the filter head 200. By facilitating flow in this manner, the flow relief feature 228 reduces the pressure drop in the clean-side oil flow from what it would be in the absence of the flow relief feature 228.

The notched locating feature 110 together with the cutout on the filter head 200 makes the use of a standard circular O-ring seal undesirable for certain applications. Due the notch in the sleeve, a standard circular O-ring seal would be located relatively close to the base 102, leaving little room for the aforementioned instrumentation. By configuring the O-ring seal 120, 160, 170 and end cap groove to be multi-planar, as described above, a portion of the O-ring seal 120, 160, 170 and end cap groove are located axially farther away from the base 102. This provides more space as needed for any instrumentation the user would like to attach to the sleeve 104.

Inclined circular O-ring seals have been contemplated, but such O-ring seals have only one point on the sleeve 104 where the seal is at a maximum distance away from the base 102. But the O-ring seal 120, 160, 170 may have a substantial portion of the sleeve circumference at the maximum distance from the base 102, offering the user more options and flexibility for using the space between the seal 120, 160, 170 and the base 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter head for use with a filter end cap having a base; and a sleeve attached to the base, the sleeve surrounding a central aperture in the filter end cap and projecting axially away from the base, wherein the sleeve includes: a notched locating feature in a distal edge of the sleeve; and a seal groove surrounding an outer surface of the sleeve, the seal groove having a first planar segment lying in a first plane and located between the base and the distal edge of the sleeve, and a second planar segment lying in a second plane different from the first plane, the second planar segment located between the base and the notched locating feature, the filter head comprising:
a body that includes:
a central opening that extends into an interior of the body, the central opening extending parallel to a longitudinal axis of the body, wherein the central opening is configured to accommodate the sleeve when the filter end cap is assembled to the filter head, wherein a wall portion in the interior of the body defines the central opening, the wall portion having an end cap locating feature configured to align with the notched locating feature in the sleeve; and
a secondary opening that extends parallel to the longitudinal axis and into an interior of the body a shorter distance than the central opening, the secondary opening being configured to accommodate the base when the filter end cap is assembled to the filter head.

2. The filter head of claim 1, wherein the central opening includes a relief feature to facilitate liquid flow through the filter head.

3. The filter head of claim 2, wherein the relief feature comprises a chamfered edge of the wall portion, the relief feature being configured to align with the end cap locating feature and the notched locating feature.

4. The filter head of claim 1, wherein a cross-sectional area of the secondary opening being larger than a cross-sectional area of the central opening such that the entire cross-sectional area of the central opening resides within the cross-sectional area of the secondary opening.

5. The filter head of claim 4, wherein the central opening and the secondary opening are concentric.

6. The filter head of claim 1, wherein the body is cylindrical.

7. The filter head of claim 1, wherein the central opening has a circular cross-section.

8. The filter head of claim 1, wherein the secondary opening has a circular cross-section.

9. The filter head of claim 1, wherein the body further includes a bore-through portal which extends, transverse to the longitudinal axis, from a first opening in a first location of an outer wall of the body through the body to a second opening in a second location of the outer wall, wherein the first location is different from the second location, and wherein the bore-through portal intersects with the central opening.

10

10. The filter head of claim 9, wherein the bore-through portal intersects with the central opening at a distal end of the central opening.

11. A filter assembly comprising:
a filter end cap including:
a base; and
a sleeve attached to the base, the sleeve surrounding a central aperture in the filter end cap and projecting axially away from the base, wherein the sleeve includes:
a notched locating feature in a distal edge of the sleeve; and
a seal groove surrounding an outer surface of the sleeve, the seal groove having a first planar segment lying in a first plane and located between the base and the distal edge of the sleeve, and a second planar segment lying in a second plane different from the first plane, the second planar segment located between the base and the notched locating feature; and
a filter head assembled to the filter end cap, the filter head comprising:
a body that includes:
a central opening that extends into an interior of the body, the central opening extending parallel to a longitudinal axis of the body, wherein the central opening is configured to accommodate the sleeve when the filter end cap is assembled to the filter head, wherein a wall portion in the interior of the body defines the central opening, the wall portion having an end cap locating feature configured to align with the notched locating feature in the sleeve; and
a secondary opening that extends parallel to the longitudinal axis and into an interior of the body a shorter distance than the central opening, the secondary opening being configured to accommodate the base when the filter end cap is assembled to the filter head.

12. The filter assembly of claim 11, wherein the body further includes a bore-through portal which extends, transverse to the longitudinal axis, from a first opening in a first location of an outer wall of the body through the body to a second opening in a second location of the outer wall, wherein the first location is different from the second location, and wherein the bore-through portal intersects with the central opening.

13. The filter assembly of claim 11, wherein the first plane is normal to the axially-projecting sleeve, and the second plane is normal to the axially-projecting sleeve such that the first plane is parallel to the second plane.

14. The filter assembly of claim 11, wherein the filter end cap further comprises a seal having a first planar segment lying a first seal plane and a second planar segment lying in a second seal plane different from the first seal plane, the seal being configured to seat in the seal groove.

15. The filter assembly of claim 11, wherein a cross-sectional area of the secondary opening being larger than a cross-sectional area of the central opening such that the entire cross-sectional area of the central opening resides within the cross-sectional area of the secondary opening.

* * * * *